US008653961B2

(12) United States Patent
Kumon (10) Patent No.: US 8,653,961 B2
(45) Date of Patent: Feb. 18, 2014

(54) VEHICLE DISPLAY DEVICE AND DISPLAY METHOD

(75) Inventor: Hitoshi Kumon, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 266 days.

(21) Appl. No.: 13/131,053

(22) PCT Filed: Nov. 25, 2009

(86) PCT No.: PCT/IB2009/007553
§ 371 (c)(1),
(2), (4) Date: May 25, 2011

(87) PCT Pub. No.: WO2010/061272
PCT Pub. Date: Jun. 3, 2010

(65) Prior Publication Data
US 2011/0227717 A1  Sep. 22, 2011

(30) Foreign Application Priority Data
Nov. 25, 2008  (JP) ................................. 2008-299804

(51) Int. Cl.
*B60Q 1/00* (2006.01)

(52) U.S. Cl.
USPC ....................................... 340/441; 340/425.5

(58) Field of Classification Search
USPC ................... 340/441, 425.5, 931; 345/7, 168
See application file for complete search history.

(56) References Cited

U.S. PATENT DOCUMENTS

| 5,034,732 A | * | 7/1991 | Iino ..................................... 345/7 |
| 5,883,739 A | | 3/1999 | Ashihara et al. |
| 2005/0122313 A1 | * | 6/2005 | Ashby ............................ 345/168 |
| 2008/0158096 A1 | * | 7/2008 | Breed ................................ 345/7 |

FOREIGN PATENT DOCUMENTS

| CN | 101164805 A | 4/2008 |
| DE | 102007001266 | 7/2008 |
| JP | 07257228 | 10/1995 |
| JP | 11119147 | 4/1999 |
| JP | 2003341383 | 12/2003 |
| JP | 2005247224 | 9/2005 |
| JP | 2006142897 | 6/2006 |
| JP | 2006347451 | 12/2006 |
| JP | 2007145310 | 6/2007 |
| JP | 2007191116 | 8/2007 |
| JP | 2007296889 | 11/2007 |

(Continued)

OTHER PUBLICATIONS

Partial Translation of Notification of Reason(s) for Refusal for JP2008-299804, Drafted Nov. 22, 2010.

*Primary Examiner* — Shirley Lu
(74) *Attorney, Agent, or Firm* — Gifford, Krass, Sprinkle, Anderson & Citkowski, P.C.

(57) ABSTRACT

In a vehicle display device in the invention, because the display position of a displayed image is adjusted by a display position calculation portion (14) and a drive control portion (15) when a predetermined vehicle travel condition is detected by a travel condition detection portion (12), the display position is adjusted while the driver is looking at the displayed image. In addition, adjustment of the display position may be avoided when the driver is not looking at the displayed image. Therefore, the display device avoids annoying the driver, and avoids needless adjustment of the display position. The display position of the image is adjusted based on the detected eyeball position.

8 Claims, 4 Drawing Sheets

(56) References Cited

FOREIGN PATENT DOCUMENTS

| JP | 2008151992 | 7/2008 |
| JP | 2008155720 | 7/2008 |
| JP | 2009196473 | 9/2009 |

\* cited by examiner

VEHICLE DISPLAY DEVICE AND DISPLAY METHOD

CROSS-REFERENCE TO RELATED APPLICATIONS

This application is the U.S. National Phase of PCT/IB2009/007553 filed Nov. 25, 2009, which claims priority of Japanese Patent Application JP 2008-299804 filed Nov. 25, 2008, both of which are herein incorporated by reference.

BACKGROUND OF THE INVENTION

1. Field of Invention

The invention relates to a display device and a display method for a vehicle which are used to display an image in the field of view of a driver of the vehicle.

2. Description of Related Art

In a conventional vehicle head-up display (HUD) as a vehicle display device, which displays images by projecting light emitted from a display portion in front of a vehicle driver, to provide the driver with various kinds of information. In a conventional HUD, the position of a displayed image must be adjusted to allow a driver to view the displayed image, because the position of the eyes of a driver may vary according to the driver's physical constitution, posture, etc.

Japanese Patent Application Publication No. 2008-151992 (JP-A-2008-151992) describes an example of a conventional head-up display. According to JP-A-2008-151992, the HUD device displays images in the driver's field of view by using a concave mirror that reflects the image projected from display means. In addition, the display device uses a camera to detect the position of the driver's eyes relative to the vehicle, and adjusts the angle of the concave mirror based on the detected position of the eyes so that the image is displayed at a position that allows the driver to appropriately view the displayed image.

However, in the HUD device described in Japanese Patent Application Publication No. 2008-151992 (JP-A-2008-151992), the display position is adjusted according to changes in the position of the driver's eyes even when the driver is not looking at the displayed image, for example, when the vehicle is stopped. Therefore, the constant adjustment of the image display position meets the position of the driver's eyes more than necessary, may annoy the driver. In addition, because detection of the position of the driver's eyes and adjustment of the angle of the concave mirror continue even when the driver is not viewing the displayed image, the display position is sometimes needlessly adjusted.

SUMMARY OF THE INVENTION

The invention provides a technology that avoids annoying the driver and prevents needless adjustment of the display position.

A first aspect of the invention relates to a vehicle display device that includes: display means for displaying a displayed image in a field of view of a driver of a vehicle; eyeball position detection means for detecting an eyeball position of the drive relative to the vehicle; displayed position adjustment means for adjusting a displayed position of the displayed image relative to the vehicle based on the eyeball position detected by the eyeball position detection means; and vehicle travel condition detection means for detecting a vehicle travel condition. The displayed position adjustment means adjusts the displayed position of the displayed image if a predetermined vehicle travel condition is detected by the vehicle travel condition detection means.

In this vehicle display device, the eyeball position of the driver relative to the vehicle is detected. Besides, the displayed position of the displayed image relative to the vehicle is adjusted on the basis of the eyeball position detected. It is to be noted herein that whether the driver is looking at the displayed image is considered to be related to the vehicle travel condition. Therefore, by adjusting the displayed position of the displayed image when a predetermined vehicle travel condition is detected by the vehicle travel condition detection means, it is possible to adjust the displayed position when the driver is looking at the displayed image. Besides, it is possible to avoid adjusting the displayed position when the driver is not looking at the displayed image. That is, it can be said that when the predetermined vehicle travel condition is not detected by the vehicle travel condition detection means, the displayed position of the displayed image is not adjusted. This avoids annoying the driver, and prevents useless adjustment of the displayed position.

In the foregoing display device, the eyeball position detection means may detect the eyeball position when the predetermined vehicle travel condition is detected by the vehicle travel condition detection means.

Whether the driver is looking at the displayed image varies depending on the vehicle travel condition. It is considered that during the predetermined vehicle travel condition, the driver is looking at the displayed image. Hence, by detecting the eyeball position when the predetermined vehicle travel condition is detected by the vehicle travel condition detection means, it is possible to detect the eyeball position when the driver is looking at the displayed image. In addition, it is also possible to avoid detecting the eyeball position when the driver is not looking at the displayed image. According to this configuration, needless detection of the eyeball position is avoided.

However, the predetermined vehicle travel condition may be if the vehicle is at a predetermined-speed or a linearly traveling state.

The predetermined-speed traveling state of the vehicle refers to a state in which the vehicle is traveling at or above a predetermined speed. Besides, the linearly traveling state of the vehicle refers to a state in which the vehicle is traveling substantially straight. When the vehicle is traveling at or above the predetermined speed, the driver is considered to be driving the vehicle while minding his/her driving operations. Besides, when the vehicle is traveling substantially straight, the driver is considered to be driving the vehicle while looking at ahead in the traveling direction of the vehicle. It is to be noted herein that the displayed image is often displayed with regard to items that are related to driving operations. Besides, the displayed image is usually displayed ahead in the traveling direction from the driver. Hence, by adjusting the displayed position of the displayed image when the state in which the vehicle is traveling at or above the predetermined speed or the state in which the vehicle is traveling substantially straight is detected, it is possible to adjust the displayed position when the driver is looking at the displayed image.

The display position adjustment means may also adjust the display position of the image based on a moving average of the eyeball position over a predetermined time.

In some cases, the eyeball position of the driver temporarily changes due to a movement or the like that is not related to the driving of the vehicle, although the driver is in a state of driving the vehicle. In the moving average of the eyeball position within a predetermined time, the time-dependent changes in the eyeball position are averaged in a predetermined time width, and therefore the influence of a temporal change is reduced. Therefore, due to the adjustment of the displayed position of the displayed image on the basis of the moving average of the eyeball position in the predetermined time, even when the eyeball position of the driver temporarily changes, the displayed position can be adjusted on the basis of the position where the influence of the temporal change is reduced. Hence, the displayed position can be adjusted, with good precision, to a position that makes it easy for the driver to visually recognize what is displayed.

Besides, the display device may further include seat position detection means for detecting position of a seat where the driver sits, and the displayed position adjustment means may adjust the displayed position of the displayed image if it is detected by the seat position detection means that the position of the seat has not shifted for a certain time.

If the seat position has changed, various situations are conceivable, including a situation in which the driver has been replaced with the other driver, a situation in which the driver has remained the same but has changed his/her posture, etc. However, if the seat position has not changed, the possibility of the driver having been replaced, or the driver having made a change in posture is considered to be low, and therefore any changes in the eyeball position of the driver D are temporary. Therefore, if it is determined that the seat position has not changed for a predetermined period of time, the display position may be adjusted based on a position where the influence of a temporary change is reduced, by adjusting the display position of the image based on the moving average of the eyeball position over a predetermined time. Therefore, the display position may be adjusted precisely to a position that makes it easy for the driver to visually recognize what is displayed, and facilitates viewing of the displayed image by the driver.

A second aspect of the invention relates to a display method that includes: detecting the eyeball position of a driver of a vehicle; determining whether the driver is driving the vehicle; displaying an image in the field of view of the driver based on the detected eyeball position, if it is determined that the driver is driving the vehicle; detecting the traveling state of the vehicle; and adjusting the position of the displayed image if a predetermined traveling state is detected.

According to the vehicle display device and the display method in accordance with the invention, it is possible to avoid annoying the driver of the vehicle, and to avoid needless adjustment of the display position.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
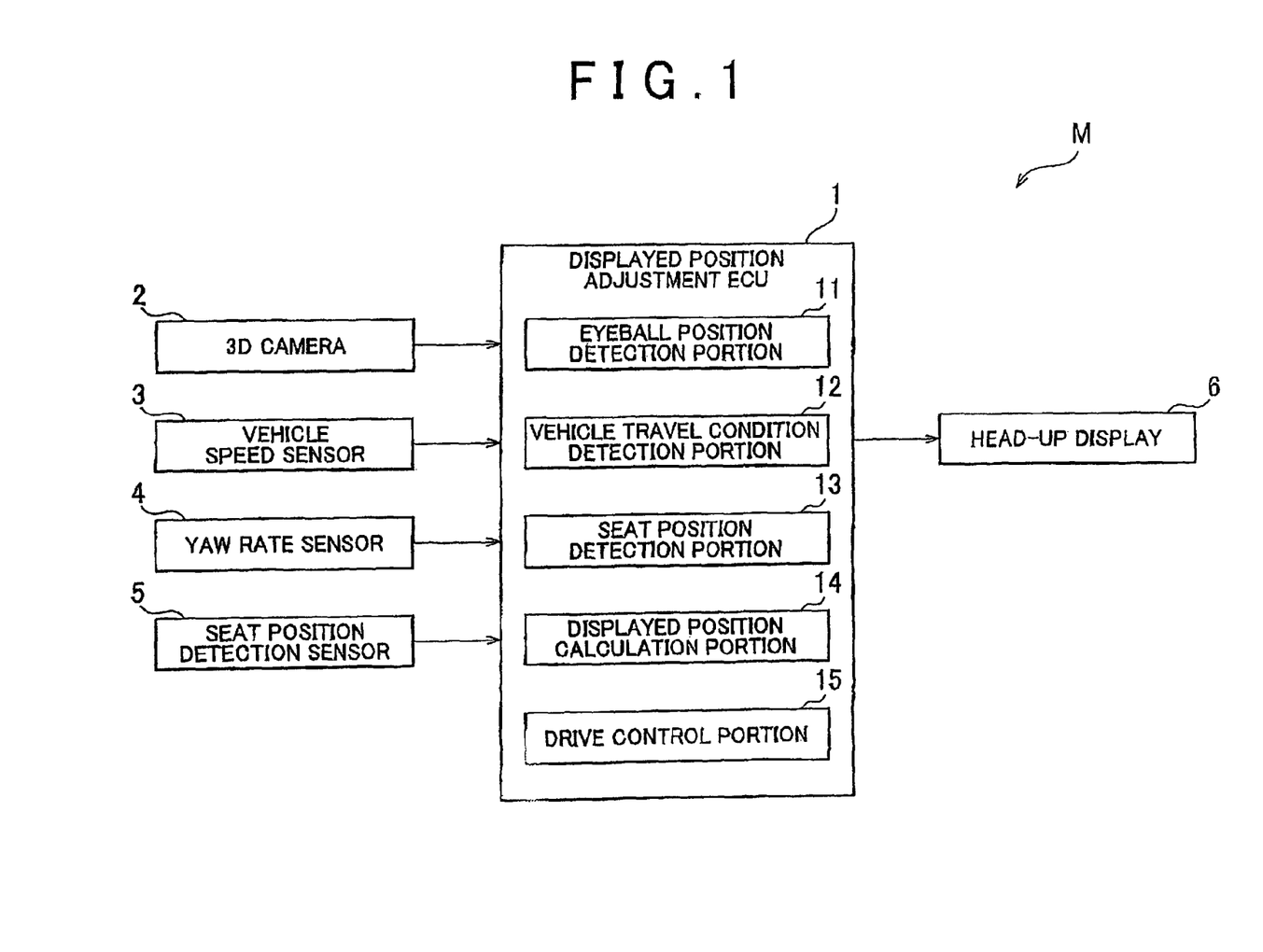
FIG. 1 is a block configuration diagram showing a vehicle display device in accordance with an embodiment of the invention.
Figure 2:
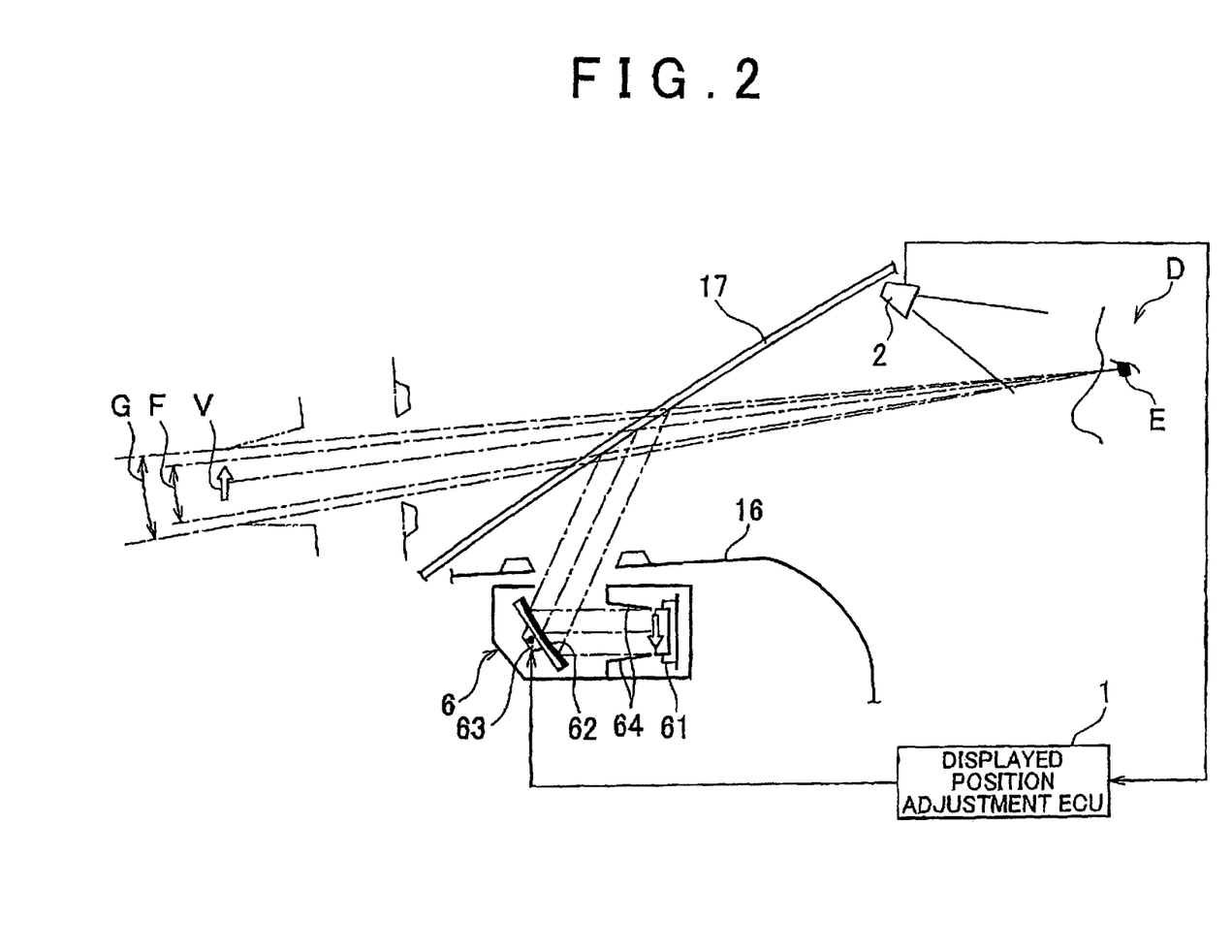
FIG. 2 is a schematic sectional view of the vehicle display device in accordance with the embodiment of the invention.

First, with reference to FIG. 1 and FIG. 2, the configuration of a vehicle display device in accordance with this embodiment will be described. FIG. 1 is a block configuration diagram of a vehicle display device M, and FIG. 2 is a schematic sectional view of the vehicle display device M.

The vehicle display device M shown in FIG. 1 is mounted in a vehicle, and is provided to display images in the field of view of the driver. As shown in FIG. 1, the vehicle display device M includes a display position adjustment electronic control unit (ECU) 1, a three-dimensional camera (3D camera) 2, a vehicle speed sensor 3, a yaw rate sensor 4, a seat position sensor 5, and a head-up display (HUD) 6. The 3D camera 2, the vehicle speed sensor 3, the yaw rate sensor 4, and the seat position sensor 5 are each electrically connected to the display position adjustment ECU 1. In addition, the display position adjustment ECU 1 is electrically connected to the HUD 6.

The 3D camera 2 takes stereoscopic images of an object. The 3D camera 2 is provided at a forward position in the vehicle cabin, and takes an image of a range that contains the driver's face at predetermined intervals, and generates image signals. In addition, the 3D camera 2, simultaneously with the generation of image signals, generates position signals regarding various points on an image-taking object relative to the position of the 3D camera 2, and correlates the position signals to the image signals. The 3D camera 2 successively outputs the image signals with correlated position signals, to the display position adjustment ECU 1.

The vehicle speed sensor 3 detects the speed of the vehicle. The vehicle speed sensor 3 includes four speed sensors that are provided at four road wheels, respectively, so that each speed sensor measures the rotational speed of a corresponding wheel. In addition, the vehicle speed sensor 3 detects the vehicle speed based on the rotational speeds of the four wheels, and generates a vehicle speed signal that indicates the detected vehicle speed. The vehicle speed sensor 3 outputs the detected vehicle speed to the display position adjustment ECU 1.

The yaw rate sensor 4 detects the yaw rate of the vehicle, and is attached to a predetermined site in the vehicle. The yaw rate sensor 4 generates a yaw rate signal that shows the detected yaw rate, and outputs the detected yaw rate to the display position adjustment ECU 1.

The seat position sensor 5 detects the position of the driver's seat. The seat position sensor 5 generates a seat position signal that indicates the detected seat position, and outputs the detected seat position to the display position adjustment ECU 1.

The display position adjustment ECU 1 is constructed of a computer that includes a CPU (Central Processing Unit), a ROM (Read-Only Memory), a RAM (Random Access Memory), etc. The display position adjustment ECU 1 adjusts the position of an image that is displayed on the HUD 6 shown in FIG. 2. As shown in FIG. 1, the display position adjustment ECU 1 includes an eyeball position detection portion 11, a vehicle travel condition detection portion 12, a seat position detection portion 13, a display position calculation portion 14, and a drive control portion 15. The display position adjustment ECU 1 acquires signals from the 3D camera 2, the vehicle speed sensor 3, the yaw rate sensor 4, and the seat position sensor 5, and adjusts the position of the displayed image by executing predetermined processes based the acquired signals.

The eyeball position detection portion 11 acquires image signals from the 3D camera 2, and detects an image of the eyeballs E of the driver D shown in FIG. 2, from the acquired signals by processing the acquired image. The eyeball position detection portion 11 also detects the position signals of the eyeballs E of the driver D which corresponds to the detected image of the eyeballs E, from the position signals attached to the image signals.

Furthermore, the eyeball position detection portion 11 converts the detected position of the eyeballs E into a position that is relative to the vehicle as a reference position, and generates an eyeball position signal based on the converted position. The eyeball position is detected by the eyeball position detection portion 11 and the detection is performed each predetermined interval, and the eyeball position detection portion 11 stores each successively detected eyeball position. The eyeball position detection portion 11 can be regarded as eyeball position detection means.

The vehicle travel condition detection portion 12 acquires the detected vehicle speed from the vehicle speed sensor 3, and detected yaw rate from the yaw rate sensor 4, and determines the vehicle travel condition based on the detected vehicle speed and detected yaw rate. The vehicle travel condition detection portion 12 may be regarded as vehicle travel condition detection means.

The seat position determination portion 13 determines the position of the driver's seat. The seat position determination portion 13 acquires detected seat position from the seat position sensor 5, and successively stores the detected seat positions. The seat position sensor 13 determines whether the seat position has remained unchanged for a predetermined period of time. The seat position sensor 13 can be regarded as seat position detection means.

The display position calculation portion 14 calculates the position of a image that is displayed on the HUD 6. The display position calculation portion 14 calculates the display position of an image based on the eyeball position signal generated by the eyeball position detection portion 11. The display position calculation portion 14 generates a display position signal that indicates the calculated display position of the image.

The drive control portion 15 adjusts the display position of an image displayed on the HUD 6. The drive control portion 15 controls a drive device provided in the HUD 6, in accordance with the display position calculated by the display position calculation portion 14. In addition, the drive control portion 15 determines whether an initial adjustment of the display position has been completed.

Thus, the display position calculation portion 14 and the drive control portion 15 adjust the position of the displayed image based on the eyeball position detected by the eyeball position detection portion 11. The display position calculation portion 14 and the drive control portion 15 may be considered the display position adjustment means.

The HUD 6 displays an image in the field of view of the driver D. As shown in FIG. 2, the HUD 6 is provided within the dashboard 16, and includes a display 61, a mirror 62, a drive device 63, a display frame 64, etc. The HUD 6 may be considered a display means.

Furthermore, the HUD 6 displays information regarding vehicle driving operations. Examples of the information that the HUD 6 displays in the displayed image V may include the vehicle speed, the engine speed, navigation information, warnings regarding the driving, a fuel economy indicator, operation assist information transmitted from an external infrastructure, etc.

FIG. 2 shows a situation where the driver D of the vehicle drives the vehicle while paying visual attention ahead of the vehicle. The vehicle is provided with the dashboard 16, in which the HUD 6 is contained. In addition, the 3D camera 2 is provided in a forward position of the vehicle cabin. The 3D camera 2 is oriented to face of the driver D. The 3D camera 2 is connected to the display position adjustment ECU 1. The display position adjustment ECU 1 is also connected to the drive device 63 of the HUD 6.

In the HUD 6, an image V is projected from the display 61 toward the mirror 62, and the image V is reflected from the mirror 62 toward a windshield 17. Furthermore, the image V is reflected from the windshield 17 toward the eyeballs E of the driver D, so that the image V is displayed as a virtual image at a predetermined display position.

The display position of the image V displayed on the HUD 6 may be adjusted by adjusting the focal point of the displayed image V projected from the display 61, or by adjusting the angle of the mirror 62. The angle of the mirror 62 is adjusted by the drive device 63. The drive device 63 is controlled by the drive control portion 15. By adjusting the angle of the mirror 62, the display position of the image V is adjusted to the display position calculated by the display position calculation portion 14. In this manner, the driver D may view the image V that is displayed at a predetermined display position within the field of view ahead of the driver D, while driving the vehicle.

Furthermore, in the HUD 6, the image V projected from the display 61 is displayed through the display frame 64 that is provided near the display 61, and through an opening of the dashboard 16. Therefore, the range over which the driver D is able to view the displayed image V is limited that determined based the position of the eyeballs E of the driver D, the position of the display frame 64, and the position of the opening in the dashboard 16. FIG. 2 shows a proper range F that is suitable for the driver D to view the displayed image V, and a visually recognizable range G in which the displayed image V is visually recognizable by the driver D. The proper range F is positioned forward in the traveling direction of the vehicle, and on a sight line of the driver D. Therefore, when the displayed image V is displayed in the proper range F, the driver D is able to easily view the displayed image V while looking ahead in the traveling direction of the vehicle.

Figure 3:
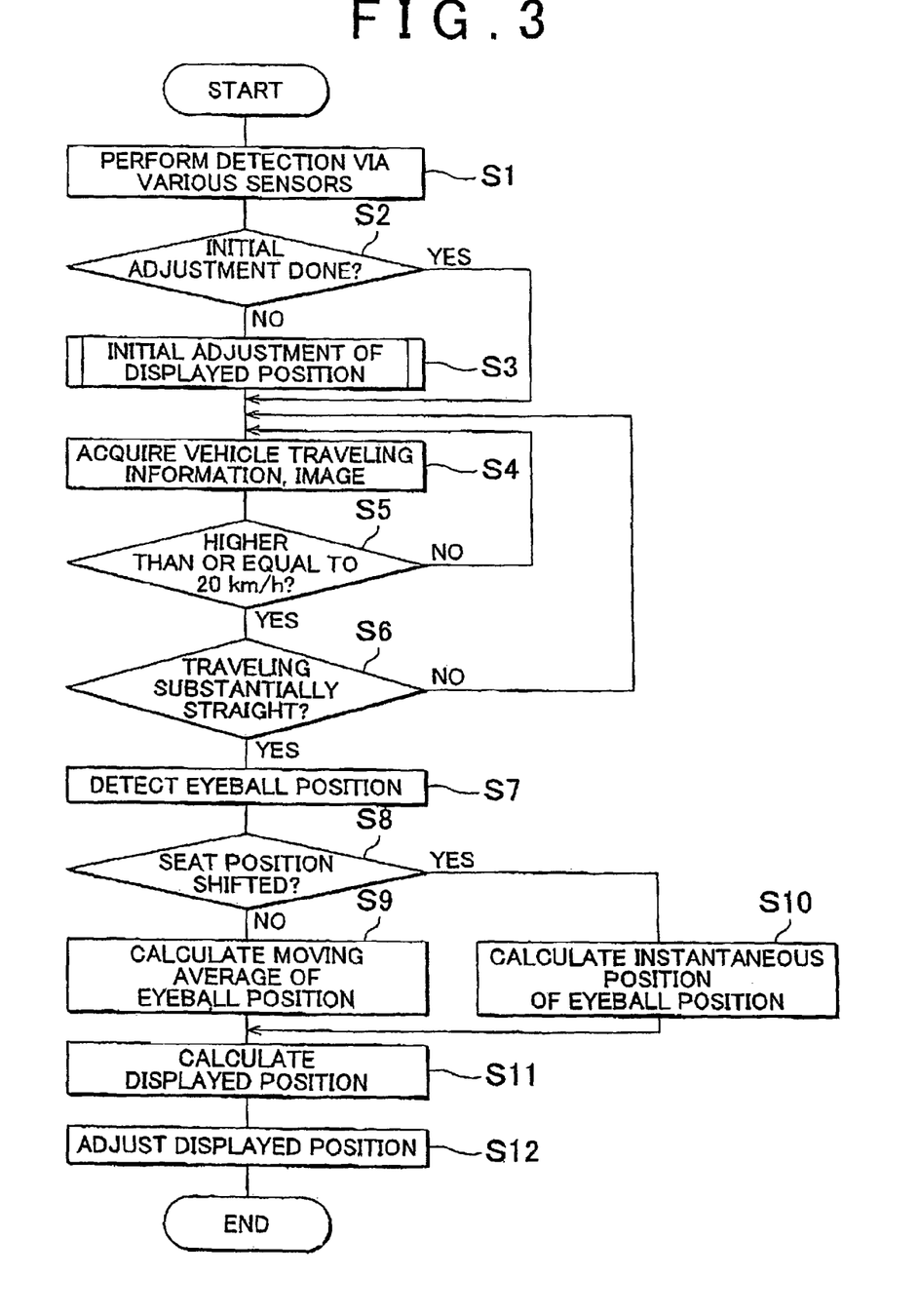
FIG. 3 is a flowchart showing a process executed by the vehicle display device.
Figure 4:
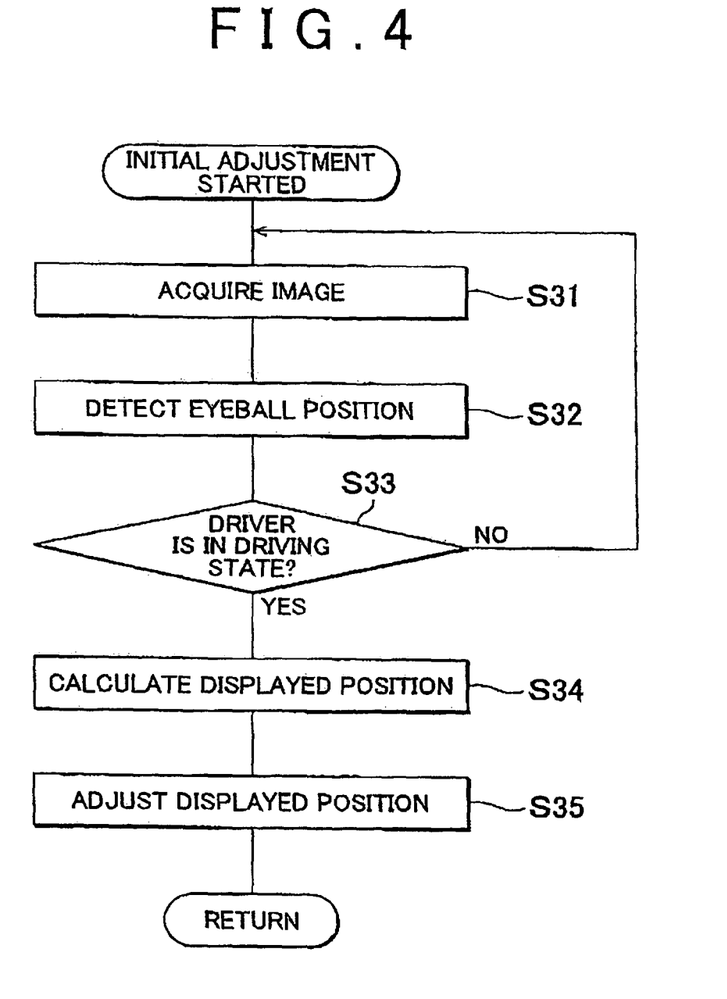
FIG. 4 is a flowchart showing a portion of the process shown in FIG. 3.

Operations of the vehicle display device M constructed as described above will be described below. FIG. 3 is a flowchart showing a process executed by the vehicle display device M, and FIG. 4 is a flowchart showing a portion of the process shown in FIG. 3. The process described below is executed at predetermined intervals during a period from when the engine is started until when the engine is stopped, i.e., the time that the engine is running.

First, the 3D camera 2 and the vehicle speed sensor 3 as well as the yaw rate sensor 4 and the seat position sensor 5 perform predetermined detection (S1). The 3D camera 2 captures an image of a range that contains the driver's face at predetermined intervals, and generates an image signal and a position signal, and outputs each successively generated image signal with an attached position signal to the display position adjustment ECU 1. The vehicle speed sensor 3 and the yaw rate sensor 4 detect the vehicle speed and the yaw rate of the vehicle, and output the vehicle speed signal and the yaw rate signal to the display position adjustment ECU 1. The seat position sensor 5 detects the position of the driver's seat, and outputs the detected seat position to the display position adjustment ECU 1.

Next, the vehicle display device M determines whether the initial adjustment of the display position has been done (S2). The drive control portion 15 stores the number of times that the initial adjustment has been performed since the starting of the engine. If the number of initial adjustments stored equals 1, it is determined that the initial adjustment has been made (YES in S2). In this case, the process executed by the vehicle display device M proceeds to acquire vehicle travel information and images (S4). However, if the number of initial adjustments stored equals 0, it is determined that the initial adjustment has not been made NO in S2).

If it is determined that the initial adjustment is not done, the vehicle display device M performs the initial adjustment of the display position of the image V (S3). The initial adjustment of the display position will be described with reference to FIG. 4.

In the initial adjustment of the display position, firstly the eyeball position detection portion 11 acquires the image signal from the 3D camera 2 (S31). The image signal includes information about the image of the range that contains the face of the driver D.

Next, the eyeball position is detected (S32). The eyeball position detection portion 11 detects the image of the eyeballs E of the driver D as shown in FIG. 2 from the image signal by processing the acquired image. The eyeball position detection portion 11 also detects the position of the eyeballs E of the driver D that corresponds to the detected image of the eyeballs E, from the acquired position signal. Then, the eyeball position detection portion 11 converts the detected position of the eyeballs E into the position thereof that is relative to the vehicle as a reference position, and generates an eyeball position signal.

Next, it is determined whether the driver D is in a state of driving the vehicle (S33). The eyeball position detection portion 11 determines whether the driver D is driving the vehicle, based on the detected eyeball position. For example, if the detected position of the driver's eyeballs E indicate that the driver D is looking downward, the eyeball position detection portion 11 determines that the driver D is not driving the vehicle (NO in S33). If it is determined that the driver D is not driving the vehicle, the eyeball position detection portion 11 returns to step S31, in which the eyeball position detection portion 11 acquires an image signals from the 3D camera 2. On the other hand, for example, if the detected position of the eyeballs E of the driver D is such that the eyeballs are directed in the traveling direction of the vehicle, the eyeball position detection portion 11 determines that the driver D is driving the vehicle (YES in S33).

If it is determined that the driver D is driving the vehicle, the display position of the image V is calculated (S34). The display position calculation portion 14 calculates the display position of the image V on based on the eyeball position detected by the eyeball position detection portion 11. The display position calculation portion 14 calculates the proper range F that is suitable for the driver D to view the image V, as a displayed position, based on the detected position of the driver's eyeballs E indicated in the eyeball position signal, and the positions of the display frame 64 and of the opening of the dashboard 16. The display position calculation portion 14 also generates a display position signal that indicates the calculated display position.

Next, the display position of the image V is adjusted (S35). The drive control portion 15 adjusts the display position of the image V based on the display position signal calculated by the displayed position calculation portion 14. Herein, the drive control portion 15 controls the drive device 63 of the HUD 6 based on the calculated display position signal. Furthermore, the drive device 63 is controlled by the drive control portion 15 to adjust the angle of the mirror 62. As the angle of the mirror 62 is adjusted, the display position of the image V is moved vertically, and is adjusted into the proper range F calculated by the display position calculation portion 14.

Thus, through the initial adjustment of the display position the display position of the image V is adjusted even at the time immediately after the starting of the engine. In addition, if it is determined that the driver D is not driving the vehicle, the display position of the image V is not adjusted. Thus, needless adjustment of the display position may be avoided.

Subsequently, the vehicle traveling information and an image are acquired again (S4), as shown in FIG. 3. The vehicle travel condition detection portion 12 acquires the detected vehicle speed from the vehicle speed sensor 3, and the detected yaw rate from the yaw rate sensor 4. In addition, the eyeball position detection portion 11 acquires the image signal from the 3D camera 2.

Next, it is determined whether the vehicle speed is greater than or equal to a predetermined speed (S5). The predetermined speed may be set to, for example, 20 km/h. The vehicle travel condition detection portion 12 determines whether the vehicle speed is higher than or equal to 20 km/h based on the detected vehicle speed. If it is determined that the vehicle speed is below 20 km/h (NO in S5), the vehicle travel condition detection portion 12 returns to step S4, in which the vehicle travel condition detection portion 12 acquires vehicle traveling information, and an image.

However, if it is determined that the vehicle speed is greater than or equal to 20 km/h (YES in S5), it is then determined whether the vehicle is traveling substantially straight (in a linearly traveling state) (S6). The vehicle travel condition detection portion 12 determines whether the vehicle is traveling substantially straight based on the detected yaw rate. If it is determined that the vehicle is not traveling substantially straight (NO in S6), the vehicle travel condition detection portion 12 returns to step S4, in which the vehicle travel condition detection portion 12 acquires travel information and an image.

If it is determined that the vehicle is traveling substantially straight (YES in S6), then the eyeball position is detected (S7). The eyeball position detection portion 11 detects an image of the eyeballs E of the driver D from the acquired image signal, by processing on the acquired image signal. The eyeball position detection portion 11 also detects the position signal of the eyeballs E of the driver D which corresponds to the detected image of the eyeballs E, from the position signal attached to the image signal. Furthermore, the eyeball position detection portion 11 converts the detected position signal of the eyeballs E into a position signal that is relative to the vehicle as the reference position, and generates an eyeball position signal. The eyeball position detection portion 11 determines the eyeball position at predetermined intervals, and the eyeball position detection portion 11 stores the successive detected eyeball position.

Whether the driver D is looking at the displayed image V varies depending on the vehicle travel condition. During a predetermined vehicle travel condition, it can be considered that the driver D is looking at the displayed image V. The predetermined vehicle travel condition in this embodiment is a state where the vehicle is traveling at or above a predetermined speed, and is traveling substantially straight. The driver D is considered to be looking at the displayed image V if the vehicle is traveling straight at the predetermined-speed. Therefore, by determining the eyeball position when the vehicle travel condition detection portion 12 determines that the vehicle traveling straight at the predetermined-speed, it is possible to detect the eyeball position when the driver D is looking at the displayed image V. Accordingly, it is also possible to avoid detecting the eyeball position when the driver D is not looking at the displayed image V. According to the foregoing process, it is possible to prevent needless detection of the eyeball position.

Next, it is determined whether the seat position has changed over a certain time period (S8). The seat position detection portion 13 of the display position adjustment ECU 1 acquires seat position signals from the seat position sensor. The seat position detection portion 13 stores each successively acquired seat positions. However, if the position of the seat shown by the seat position signal stored has not changed for the predetermined period of time, the seat position detection portion 13 determines that the position of the seat has not changed for the certain time (NO in S8). In contrast, if the seat position indicated in the stored seat position signal has changed in the certain time, the seat position detection portion 13 determines that the position of the seat has changed (YES S8).

If it is determined that the seat position has not changed for the certain period of time (NO in S8), a moving average of the eyeball position is calculated (S9). The display position calculation portion 14 calculates the moving average over a predetermined time, based on the eyeball position detected by the eyeball position detection portion 11 and stored. It should be noted that the predetermined time period is a certain time that serves as criterion for the change of the seat position.

If it is determined that the position of the seat has changed (YES in S8), an instantaneous position of the eyeball position is calculated (S10). The display position calculation portion 14 calculates as an instantaneous position the current eyeball position among the eyeball position signals that are generated by the eyeball position detection portion 11 and are stored.

Next, the display position of the image V is calculated (S11). The display position calculation portion 14 calculates as a display position a proper range F suitable for the driver D to view the displayed image V based on the calculated moving average or the calculated instantaneous position of the eyeballs E, the position of the display frame 64, and the position of the opening of the dashboard 16. The display position calculation portion 14 then generates the display position signal that indicates the calculated displayed position.

Next, the display position of the image V is adjusted (S12). The drive control portion 15 adjusts the display position of the image V based on the display position calculated by the display position calculation portion 14. To adjust the display position, the drive control portion 15 controls the drive device 63 of the HUD 6 based on the calculated displayed position signal to adjust the angle of the mirror 62. As the angle of the mirror 62 is adjusted, the display position of the image V is adjusted into the proper range F, which is the display position calculated by the display position calculation portion 14.

Through the above processes, the display position of the image V is adjusted by the vehicle display device M. Thus, the driver D may view the image V displayed at the predetermined display position in the driver's field of view when driving the vehicle.

Whether the driver D is looking at the image V is related to the vehicle travel condition. Therefore, by adjusting the display position of the image V when a predetermined vehicle travel condition is detected by the vehicle travel condition detection portion 12, it is possible to adjust the display position when the driver D is looking at the displayed image V. It is also possible to avoid adjusting the eyeball position when the driver D is not looking at the displayed image V. Therefore, according to the vehicle display device M, it is possible to avoid both annoying the driver and needless adjustment of the display position.

If the vehicle is traveling at or above a predetermined speed, the driver D is considered to be driving the vehicle while minding his/her driving operations. In addition, if the vehicle is traveling substantially straight, the driver D is considered to be driving the vehicle while paying visual attention to the area ahead of the vehicle. It is to be noted herein that the displayed image V is displayed with regard to items related to driving operations. In addition, the image V is displayed forward in the traveling direction of the vehicle from the driver D. Therefore, according to the described processes, it is possible to adjust the display position while the driver D is looking at the displayed image V.

In some cases, the eyeball position of the driver D temporarily changes due to a movement or the like that is not related to the driving of the vehicle, even though the driver D is driving the vehicle. In the moving average of the eyeball position over a predetermined time period, the time-dependent changes in the eyeball position are averaged over a predetermined span of time, and therefore the influence of a temporal change is reduced. Therefore, because the display position of the image V is adjusted based on the moving average of the eyeball position over a predetermined time, even when the eyeball position of the driver D temporarily changes, the displayed position can be adjusted on the basis of the position where the influence of the temporal change is reduced. Hence, the display position may be adjusted, with good precision, so that it is easy for the driver D to view the displayed image.

Besides, in the case where the position of the seat has shifted, various situations are conceivable, including a situation in which the driver has been replaced with the other drive, a situation in which the driver has remained the same but has changed his/her posture. However, if the position of the seat has not changed, the possibility of the driver having been replaced with the other driver, or the driver having made a change in posture is considered to be low, and therefore change in the eyeball position of the driver D, if any, is temporary. Therefore, if it is determined that the position of the seat has not changed for a certain time, the display position may be adjusted based on a position where the influence of a temporary change is reduced, by adjusting the display position of the image V based on the moving average of the eyeball position over a predetermined time period. Therefore, the display position may be precisely adjusted to facilitate visual recognition of the displayed image by the driver D.

Furthermore, when the position of the seat has changed, the current eyeball position is calculated as an instantaneous position, and the display position is adjusted based on the instantaneous position. Therefore, it is possible to adjust the display position of the image V by following or keeping up with the replacement of the driver, or changes in the driver's posture.

While the invention has been described with regard to an example embodiment thereof, the invention is not restricted to the described embodiment. For example, although the proper range F is calculated as the displayed position of the displayed image V in the described embodiment, the visually recognizable range G may also be calculated as the display position. Furthermore, although the position of the eyeball is detected when both the predetermined-speed traveling state of the vehicle and the linearly traveling state of the vehicle are, it is also possible to performed the detection of the eyeball position when either one of the states is detected. Besides, when condition(s) other than the detection of the predetermined-speed traveling state of the vehicle or the linearly traveling state of the vehicle is detected, the position of the eyeball may be detected. For example, a vehicle travel condition may be detected through detection of a gear shift position, or the like.

In the foregoing embodiment, although the predetermined time for calculating the moving average of the eyeball position is a certain time that serves as a criterion for the presence/absence of a shift in the seat position, the predetermined time may also be set based on other external factors that are considered to bring about fluctuations of the eyeball position. Furthermore, although the eyeball position of the driver D is determined based on the position of both eyeballs in the embodiment, the driver's eyeball position may also be determined based on the position of only one of the driver's eyeballs.

Besides, although the foregoing embodiment is described in conjunction with the case where the 3D camera 2 is used, the 3D camera may be replaced by any device as long as the device is able to generate an image signal and a position signal regarding the face of the driver D. For example, a monocular camera and a distance sensor may be employed in replace of the 3D camera 2. Besides, although the foregoing embodiment is described in conjunction with the case where the yaw rate sensor 4 is employed, the yaw rate sensor 4 may be replaced by any sensor or the like as long as the sensor or the like is able to detect the linearly traveling state of the vehicle. For example, the sensor may be a steering angle sensor or the like.

The invention claimed is:

1. A vehicle display device comprising:
a display unit that displays an image in a field of view of a driver of a vehicle;
an eyeball position detection unit that detects an eyeball position of the driver relative to the vehicle;
a display position adjustment unit that adjusts a display position of the image relative to the vehicle based on the detected eyeball position; and
a travel condition detection unit that detects a vehicle travel condition,
wherein the display position adjustment unit adjusts the display position of the image when the travel condition detection unit detects a linearly traveling state of the vehicle, wherein
the eyeball position detection unit detects the eyeball position when the travel condition detection unit detects the linearly traveling state of the vehicle, and wherein
the display position of the image is adjusted based on the detected eyeball position when the linearly traveling state of the vehicle is detected.

2. The vehicle display device according to claim 1, wherein the display position adjustment unit adjusts the display position of the image when the travel condition detection unit detects a predetermined-speed traveling state of the vehicle, wherein the eyeball position detection unit detects the eyeball position when the travel condition detection unit detects the predetermined-speed traveling state of the vehicle, and wherein
the display position of the image is adjusted based on the detected eyeball position when the predetermined-speed traveling state of the vehicle is detected.

3. The vehicle display device according to claim 1, wherein the display position adjustment unit adjusts the display position of the image based on a moving average of the eyeball position over a predetermined time.

4. The vehicle display device according to claim 3, further comprising
a seat position detection unit that detects a position of a driver's seat, wherein
the display position adjustment unit adjusts the display position of the image when the seat position detection unit detects that the seat position has not changed for a certain time.

5. A display method comprising:
detecting an eyeball position of a driver of a vehicle;
determining whether the driver is driving the vehicle;
displaying an image in a field of view of the driver based on the detected eyeball position, when it is determined that the driver is driving the vehicle;
detecting a vehicle travel condition; and
adjusting a display position of the image when a linearly traveling state of the vehicle is detected, and wherein
the eyeball position is detected when the linearly traveling state of the vehicle is detected, wherein
the display position of the image is adjusted based on the detected eyeball position when the linearly traveling state of the vehicle is detected.

6. The vehicle display device according to claim 1, wherein the eyeball position detection unit generates an image signal and a position signal, the image signal containing an image of a range that contains a face of the driver, and the position signal correlates to the image signal.

7. The vehicle display device according to claim 1, wherein the eyeball position detection unit is a camera.

8. The vehicle display device according to claim 1, wherein when the linearly traveling state of the vehicle is not detected by the vehicle travel condition detection unit, the displayed position of the displayed image is not adjusted.

* * * * *